(12) United States Patent
Jacobsen (10) Patent No.: US 10,668,617 B2
(45) Date of Patent: Jun. 2, 2020

(54) ROBOTIC CART PULLING VEHICLE FOR AUTOMATED PULLING OF CARTS (71) Applicant: Mobile Industrial Robots A/S, Odense SØ (DK)

(72) Inventor: Niels Jul Jacobsen, Odense SOE (DK)

(73) Assignee: MOBILE INDUSTRIAL ROBOTS A/S, Odense SOE (DK)

(*) Notice: Subject to any disclaimer, the term of this patent is extended or adjusted under 35 U.S.C. 154(b) by 315 days.

(21) Appl. No.: 15/566,516

(22) PCT Filed: Apr. 11, 2016

(86) PCT No.: PCT/DK2016/050104
§ 371 (c)(1),
(2) Date: Oct. 13, 2017

(87) PCT Pub. No.: WO2016/165721
PCT Pub. Date: Oct. 20, 2016

(65) Prior Publication Data
US 2018/0281178 A1 Oct. 4, 2018

(30) Foreign Application Priority Data
Apr. 13, 2015 (DK) .................. 2015 70212

(51) Int. Cl.
B25J 9/10 (2006.01)
B25J 5/00 (2006.01)
(Continued)

(52) U.S. Cl.
CPC ............ *B25J 9/1065* (2013.01); *B25J 5/007* (2013.01); *B25J 11/008* (2013.01); *B25J 13/086* (2013.01);
(Continued)

(58) Field of Classification Search
CPC ........ B25J 9/1065; B25J 5/007; B25J 11/008; B25J 13/086; B60D 1/04; B60D 1/246;
(Continued)

(56) References Cited

U.S. PATENT DOCUMENTS 861,339 A 7/1907 Williams et al.
4,305,601 A * 12/1981 Berge .................. A61G 5/10
280/304.1
(Continued)

FOREIGN PATENT DOCUMENTS

CN 101795921 A 8/2010
CN 203844860 U 9/2014
(Continued)

OTHER PUBLICATIONS

Extended European Search Report from European Application No. 16779651.5, dated Nov. 30, 2018.
(Continued)

*Primary Examiner* — Anne Marie Antonucci
*Assistant Examiner* — James E Stroud
(74) *Attorney, Agent, or Firm* — Burns & Levinson LLP.

(57) ABSTRACT

There is provided a robotic cart pulling vehicle for automated docking and pulling a cart, such as a wheeled hospital cart for e.g. linen. In particular the vehicle is provided with a unique gripping means for holding the cart. Furthermore, the robotic vehicle implements a positioning system for safely driving on hospital corridors and further comprises one or more sensors to indicate the position of the robot relative to the surroundings for avoiding unnecessary impacts.

20 Claims, 7 Drawing Sheets (51) Int. Cl.
  *B25J 11/00* (2006.01)
  *B25J 13/08* (2006.01)
  *B60D 1/04* (2006.01)
  *B60D 1/24* (2006.01)
  *B60D 1/62* (2006.01)
  *B60D 1/44* (2006.01)
  *G05D 1/02* (2020.01)
  *B60D 1/00* (2006.01)

(52) U.S. Cl.
  CPC .............. *B60D 1/04* (2013.01); *B60D 1/246* (2013.01); *B60D 1/44* (2013.01); *B60D 1/62* (2013.01); *G05D 1/0212* (2013.01); *G05D 1/0231* (2013.01); *G05D 1/0242* (2013.01); *G05D 1/0255* (2013.01); *B60D 2001/005* (2013.01); *G05D 2201/0216* (2013.01); *Y10S 901/01* (2013.01); *Y10S 901/09* (2013.01)

(58) Field of Classification Search
  CPC .. B60D 1/44; B60D 2001/005; G05D 1/0212; G05D 1/0231; G05D 1/0242; G05D 1/0255; G05D 2201/0216; Y10S 901/01; Y10S 901/09
  USPC ........................................................ 701/23
  See application file for complete search history.

(56) References Cited

U.S. PATENT DOCUMENTS

| | | | | |
|---|---|---|---|---|
| 5,518,260 A * | 5/1996 | Grignon | ................. | B60P 3/125 280/402 |
| 6,148,255 A * | 11/2000 | van der Lely | ....... | A01B 69/008 701/466 |
| 6,244,366 B1 * | 6/2001 | Otterson | ............... | B62B 3/1404 180/11 |
| 6,435,803 B1 * | 8/2002 | Robinson | .............. | B62B 3/1404 280/33.991 |
| 7,571,914 B2 * | 8/2009 | Holtan | ................. | B62B 3/1404 280/33.991 |
| 7,857,237 B2 * | 12/2010 | Vickers | ............... | A01M 7/0085 141/18 |
| 7,898,470 B2 * | 3/2011 | Heraud | .................. | G01S 19/35 342/357.24 |
| 7,996,109 B2 * | 8/2011 | Zini | ................. | G05B 19/41895 700/245 |
| 8,360,459 B2 * | 1/2013 | Holtan | ..................... | B60D 1/02 280/495 |
| 9,288,938 B2 * | 3/2016 | Cavender-Bares | ......................... | A01C 21/002 |
| 9,669,857 B1 * | 6/2017 | Rainey | .................. | B62B 5/0026 |
| 10,017,322 B2 * | 7/2018 | High | .................. | B66F 9/07581 |
| 10,233,056 B1 * | 3/2019 | Brauer | .................. | B62B 5/0079 |
| 2004/0093650 A1 | 5/2004 | Martins et al. | | |
| 2004/0245030 A1 * | 12/2004 | Holtan | .................. | B62B 3/1404 180/19.1 |
| 2004/0256166 A1 * | 12/2004 | Holtan | ................ | B60B 33/0007 180/65.51 |
| 2006/0042842 A1 * | 3/2006 | Berg | ........................ | A47F 10/04 180/19.1 |
| 2008/0230286 A1 * | 9/2008 | Turner | .................... | B60S 13/00 180/19.2 |
| 2011/0005846 A1 * | 1/2011 | Page | ........................ | B25J 5/005 180/8.7 |
| 2012/0139209 A1 * | 6/2012 | Weiss | .................. | B66F 9/07504 280/482 |
| 2015/0360882 A1 * | 12/2015 | Girtman | ................ | B25J 9/0093 700/213 |
| 2018/0362270 A1 * | 12/2018 | Clucas | .................. | B25J 9/0093 |

FOREIGN PATENT DOCUMENTS

| | | | | |
|---|---|---|---|---|
| EP | 2108563 A2 | 4/2009 | | |
| EP | 1867500 B1 | 7/2009 | | |
| EP | 2108563 A2 | 10/2009 | | |
| GB | 2436712 A | 3/2007 | | |
| GB | 2436712 A * | 10/2007 | .......... | B62B 5/0026 |
| WO | 2006/089071 A2 | 8/2006 | | |
| WO | 2015/047195 A1 | 4/2015 | | |
| WO | WO-2015047195 A1 * | 4/2015 | | |

OTHER PUBLICATIONS

First Office Action (Chinese Version) for CN 201680021545.8, 6 pages (dated Aug. 1, 2019).

International Search Report and Written Opinion from International Patent Application No. PCT/DK2016/050104, dated Jun. 27, 2016.

* cited by examiner

ROBOTIC CART PULLING VEHICLE FOR AUTOMATED PULLING OF CARTS

This application is a National Stage Application of International Patent Application No. PCT/DK2016/050104, filed 11 Apr. 2016, which claims benefit of Serial No. PA 2015 70212, filed 13 Apr. 2015 in Denmark and which applications are incorporated herein by reference. To the extent appropriate, a claim of priority is made to each of the above disclosed applications.

FIELD OF THE INVENTION

The present invention relates to robotic cart pulling vehicles for automated hauling of materials indoors. More specifically, the present invention relates to a cart pulling guided mobile robot system enabling automatic docking and undocking of the cart.

BACKGROUND OF THE INVENTION

The transportation of articles within a structure, or between multiple structures has posed, to some degree, a problem. Many transportation options exist today as commercially available products, for example, conveyer belts, pneumatic tubes, gimbled carts, and mobile robots. Mobile robots, or Autonomous Guided Vehicles, are vehicles that have been equipped with a drive system under computer control which allows autonomous guidance between two locations.

Although, there is significant economic incentive to introduce mobile robots into hospitals and laboratories, relatively little progress has been made towards using mobile robots to deliver hospital supplies. For example, the physical movement of linen, medical specimens, pharmaceuticals, blood products, patient charts, x-rays, and meals cost huge amounts annually for hospitals with over 500 beds.

Towing trailers with a rear mounted towing apparatus on AGV's are well known in the art. Commonly a commercial hitch and ball are mounted at one end of the AGV, usually the rear, whereat a trailer comprising a releasable socket and tow bar is connected.

Robotic and automated vehicles for delivering or transporting material indoors have been developed and utilized in a number of applications. One well-known application is the automated mail delivery vehicles and robots. Rather than being an independent robotic vehicle, this is an automatic guided vehicle following a prepared track, such as a painted ultraviolet track positioned on the floor.

In the hospital environment some companies have developed robotic couriers for hospitals. The robotic couriers were essentially wheeled cabinets. These robotic couriers have many disadvantages; for instance they are only useful for transporting materials that can fit in or on the associated cabinet installed with the robot. In some of the commercially available solutions the robot vehicle drives in below and lifts the cart. Meanwhile this solution requires that the cart is specially built for that purpose in order to provide the necessary room for the robot vehicle below its frame.

US2004093650 discloses a mobile robot system for performing a plurality of separate operations comprising at least one autonomous wheeled mobile robot having at least one wheel-driving motor, an on-board computer; means for navigation, orientation, and maneuvering in an environment with moving obstacles; a sensor system; and a wireless communication system for receiving and sending signals. The mobile robot system disclosed in US2004093650 is useful for hauling materials on a variety of carts or wagons using a coupling hitch hook bar as cart attaching mechanism. Meanwhile, the cart attaching mechanism US2004093650 is not able to freely move over a pivot point and is not suitable for hauling carts on an uneven support. Thus, there is a need for flexible cart attachment mechanism on an automated guided vehicle suitable for attaching a variety of carts securely.

All of the above discussed prior art has substantial disadvantages. It is the object of the present invention to improve upon the prior art and provide a cart or wagon pulling deduced reckoning guide mobile robot system useful for industrial applications, such as in hospitals, assembly production, supermarkets and like.

SUMMARY OF THE INVENTION

Accordingly, the present invention provides an improved wheeled robot for automatic docketing and towing/hauling carts and similar wagons from one position to another. The robot implements a positioning system for safely driving on hospital corridors and further comprises one or more sensors to indicate the position of the robot relative to the surroundings for avoiding unnecessary impacts. The cart mobile robot system of the present invention enables automatic docking and undocking of the cart, which is a major improvement over existing solutions.

Specifically, the present invention provides an automatically guided vehicle for towing (or pushing) a wheeled cart having at least four wheels and provided with a cart frame, the vehicle comprising:
 drive wheels;
 a robot body mounted on said drive wheels;
 a control system utilizing a navigational system;
 a cart attaching mechanism mounted on said robot body for coupling the cart to said vehicle;
 at least one proximity sensor mounted on the robot body, said control system coupled to said at least one proximity sensor for adjusting the calculated robotic position and detecting any obstacles;
wherein the cart attaching mechanism includes a trailer arm that is freely rotatable in a horizontal plane, said arm mounted in a pivot point on the robot body in one end and provided with a gripping portion in the other end for gripping and holding the cart to be towed, said gripping portion comprising:
 a vertical bar element attached to the trailer arm;
 a horizontal bar element flexibly attached via a pivot point P1 to the vertical bar element;
 a hook element for gripping the cart frame, said hook element provided with a hook, and said hook element being flexibly attached via a pivot point P2 the horizontal bar element, and wherein the hook is movable (horizontally) by actuation means;
 at least two supporting brackets positioned on each side of the hook for providing a clamp force against the cart frame.

In one embodiment of the present invention each said proximity sensor is an infrared range sensor.

Preferably the flexibility provided around the horizontal bar element and the hook element is established by springs. In one embodiment of the present invention the springs are affixed to a common spring element that is pivotably attached to the pivot point P1. It is preferred that the springs will force the vertical bar element to be approximately vertical and the horizontal bar element to be approximately horizontal relative to the support on which the robot is moving.

In a particularly preferred embodiment of the present invention the navigational system includes an automatic control and guide system for reaching a given target and at the same time avoid collision with the surroundings.

DETAILED DESCRIPTION OF THE INVENTION

Figure 1:
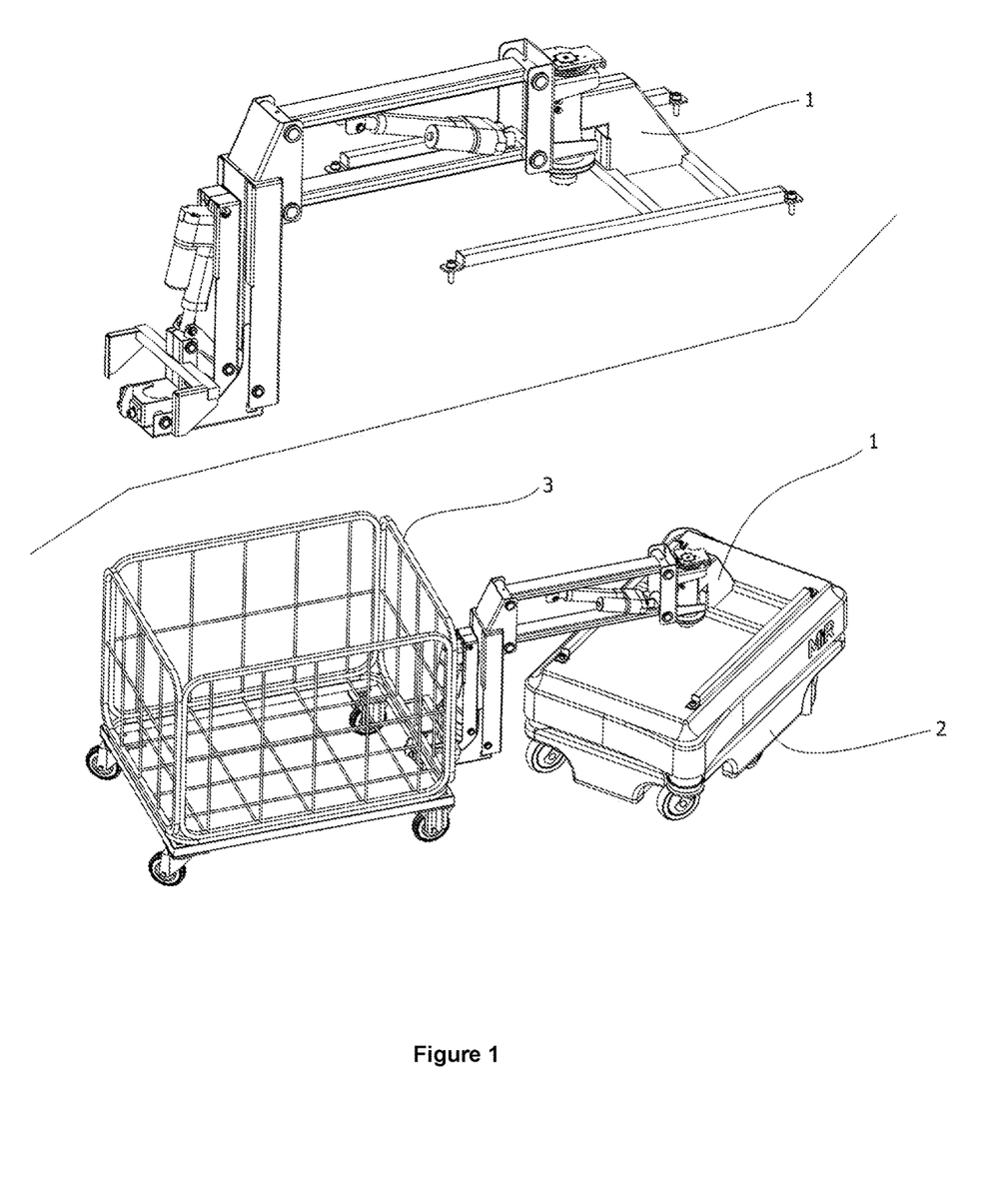
FIG. 1 shows the cart attaching mechanism and its intended use.

FIG. 1 shows the cart attaching mechanism (1) mounted on the robot (2). The cart attaching mechanism has automatically made a coupling with a cart (3) and transports it to the destination.

Figure 2:
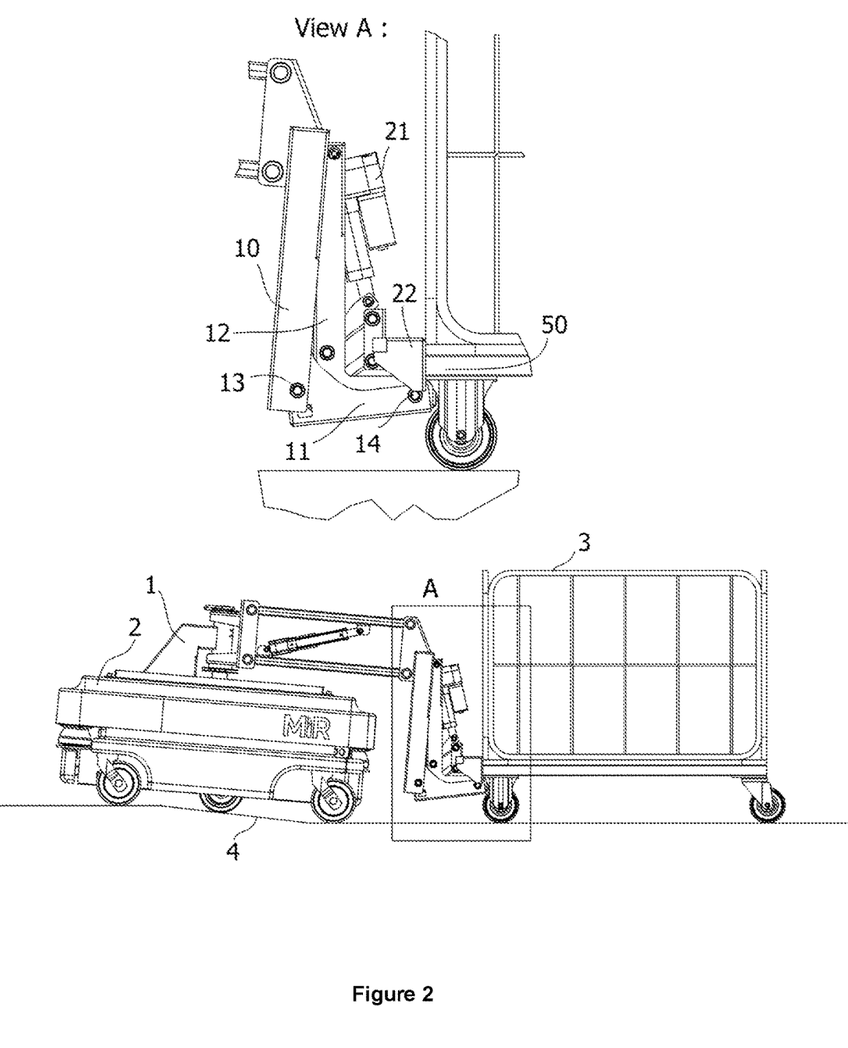
FIG. 2 shows cart attaching mechanism while driving on a ramp.

FIG. 2 shows the cart attaching mechanism (1) while driving on a small ramp (4). The flexible suspension ensures that obstacles such as ramps and similar may be traversed without any compensation means. It further ensures the flexible linkage to the coupling surface between the supporting bracket (22) and the vehicle frame is minimally burdened thereby achieving high safety against accidental uncoupling the towed cart.

Figure 3:
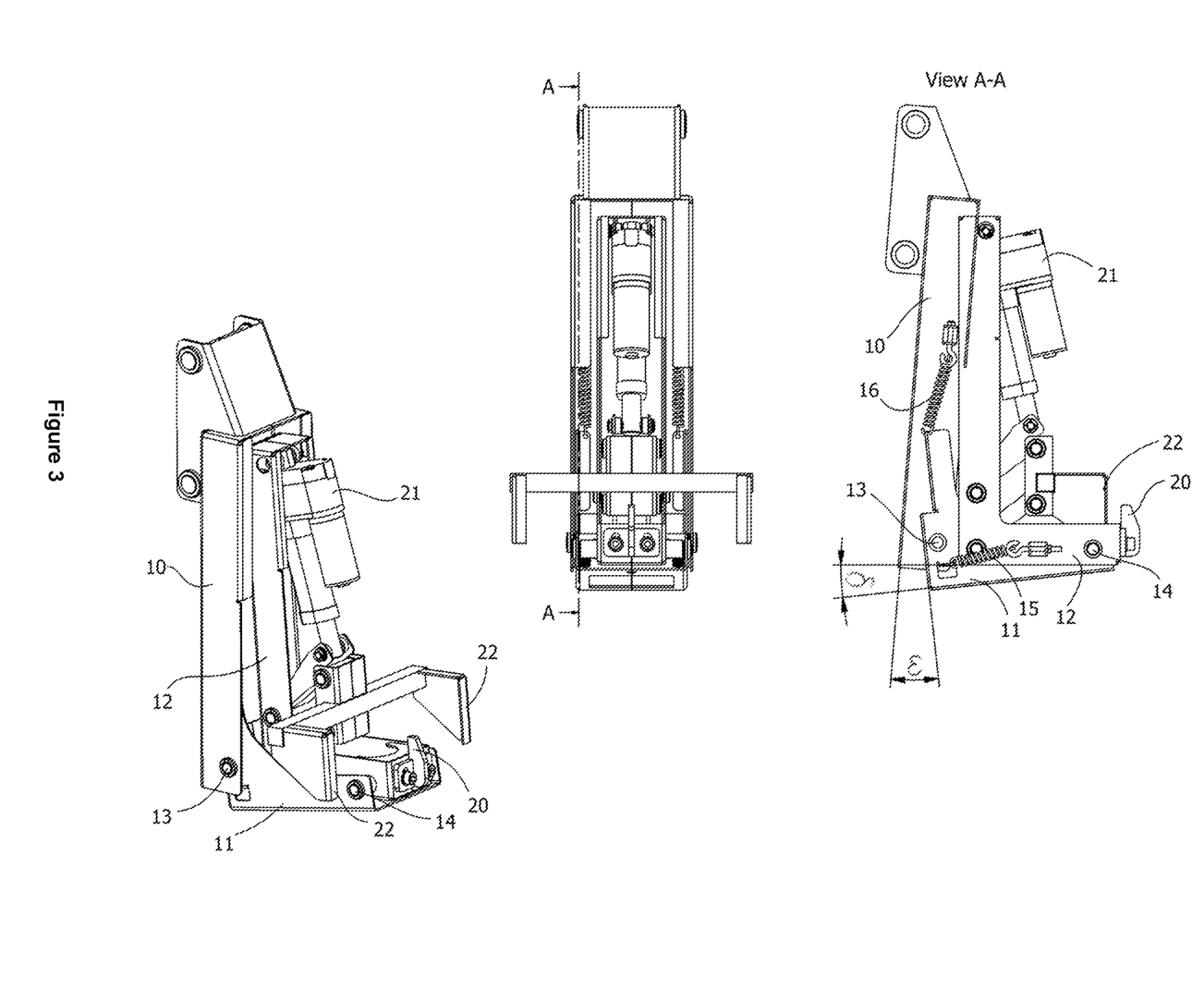
FIG. 3 shows the flexible suspension of the cart attaching mechanism while driving on a ramp.

FIG. 3 shows the cart attaching mechanism (1) with a two stage mechanism having flexible suspension with the pivot points of the axles (13) and (14). The bar (10) allows the link (11) to rotate about the axle (13). The joint (12) in which the cart attaching mechanism is mounted can rotate about the axle (14). The springs (15) and (16) will constantly try to minimize the angles δ and ε to a neutral position, when the attaching mechanism isn't attached to a cart.

Figure 4:
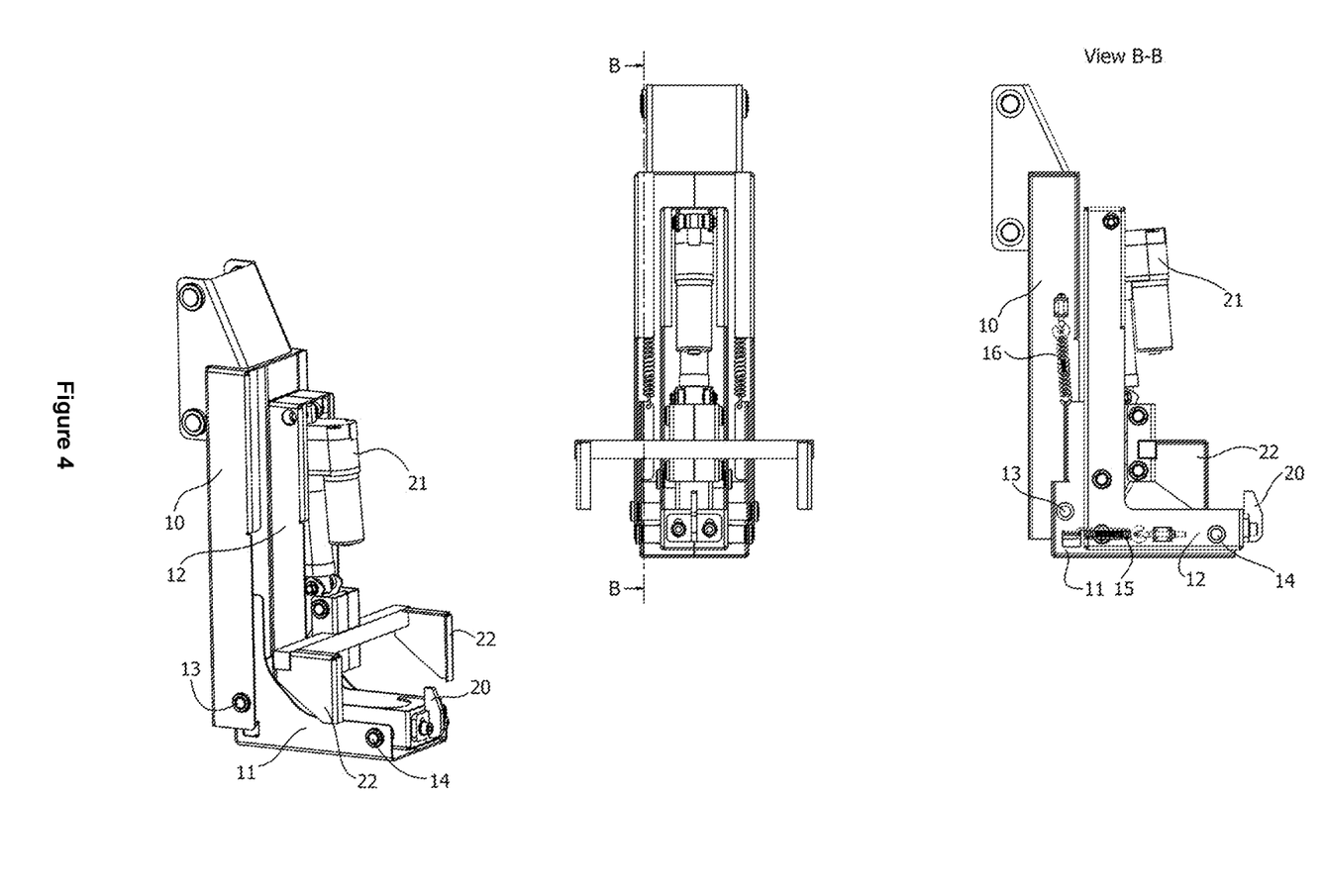
FIG. 4 shows the flexible suspension of the cart attaching mechanism in idling (neutral) state.

FIG. 4 shows the flexible suspension in the neutral position, i.e. the position to which the dual joint mechanism will return when no other forces the gravitational force is applied. The springs (15) and (16) pull the two parts (11) and (12) to their neutral position with the lowest spring tension.

Figure 5:
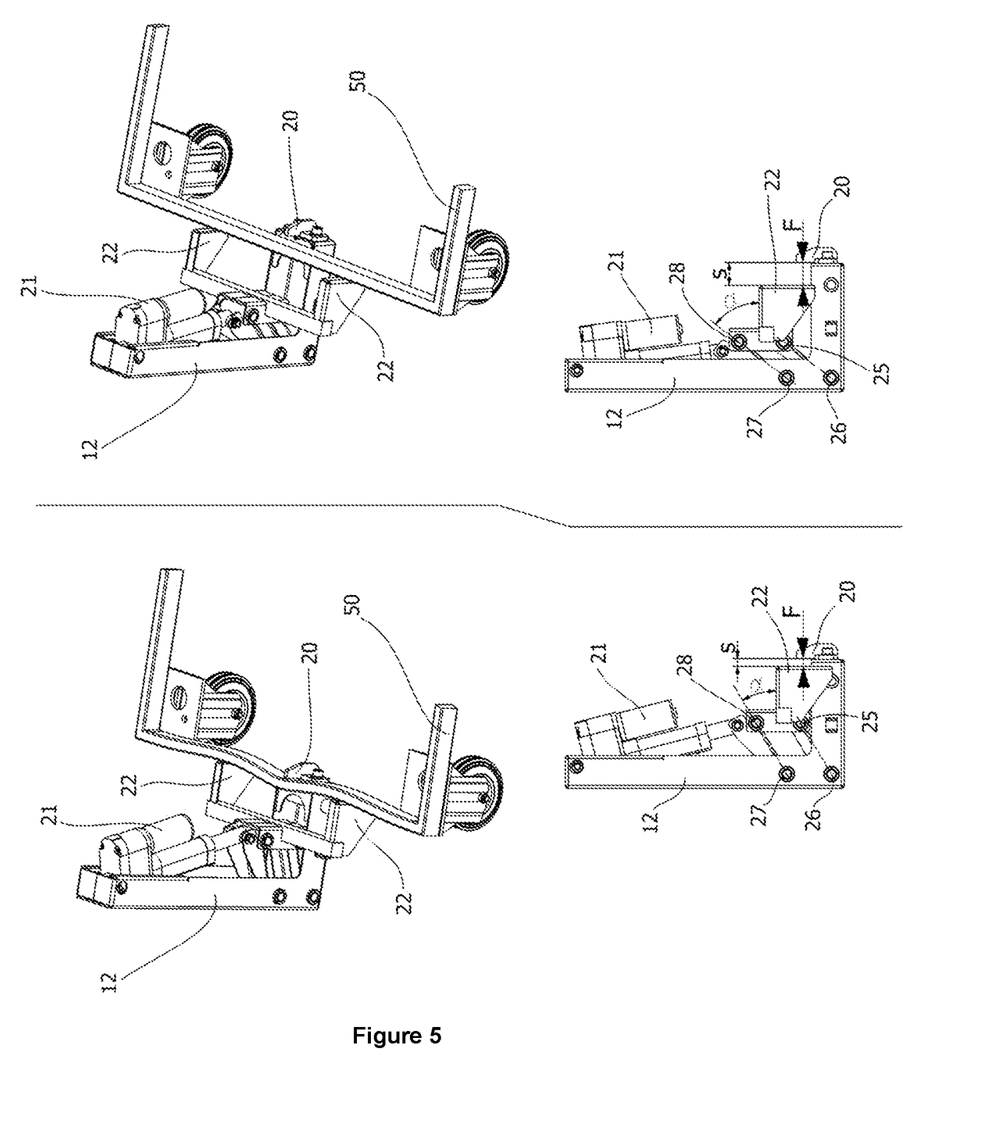
FIG. 5 shows the cart attaching mechanism.

FIG. 5 shows how the cart attaching mechanism grips and holds a cart. Prior to this coupling the gap (S) between the hook (20) and the support bracket (22) is large. When the linear actuator 21 is extended the gap (S) is reduced until there is contact between the hook (20), the base frame (50) and the support bracket (22) and the coupling occurs. When the actuator (21) begins to extend from its contracted state the gap (S) decreases rapidly and the clamping force F will be small. As the gap (S) decreases the clamping force F increases considerably since the angle α is small. This results in a less elastic deformation of the base frame (50) before the actuator 21 stops. The deformation of the base frame (50) is purposely not drawn correctly in FIG. 5. The elastic deformation ensures that the link with the base frame is resistant towards vibrations and other mechanical stress.

Thus, a very high security against accidental disconnection of the base frame (50) is ensured. The coupling mechanism is designed so that the large clamping force is primarily absorbed by the axles (25), (26), (27) and (28) and to a lesser extent by the more sensitive linear actuator (21).

Figure 6:
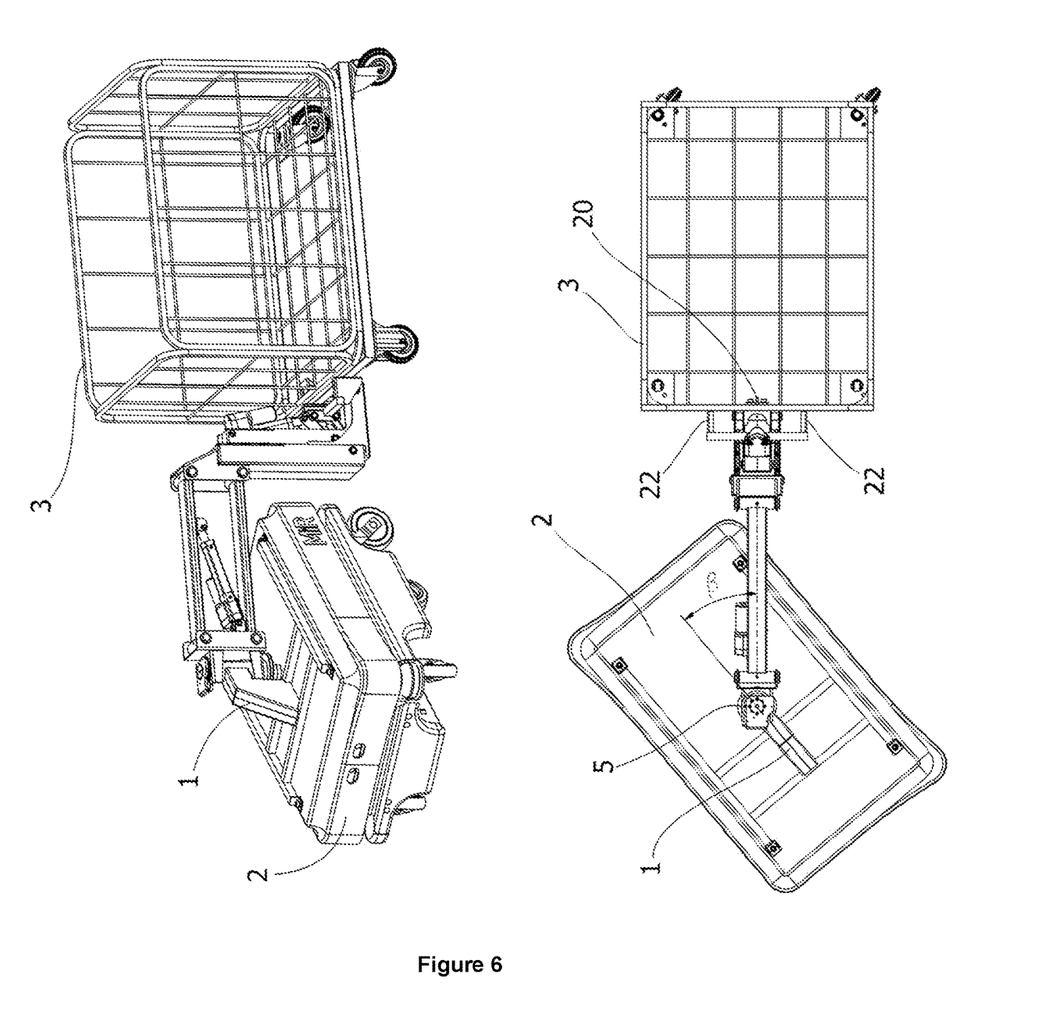
FIG. 6 shows the cart attaching mechanism and the control of the vehicle.

FIG. 6 shows how the vehicle controls the cart. The safe coupling between the cart (3) and cart attaching mechanism (1) is established by the two support brackets (22) and hook (20), which means that the cart (3) position relative to the vehicle (2) exclusively depends on the angle β. A protractor (5) on the cart attaching mechanism (1) measures the angle β, whereby the robot can safely steer the cart around obstacles irrespective of whether the robot is moving forward or backward.

Figure 7:
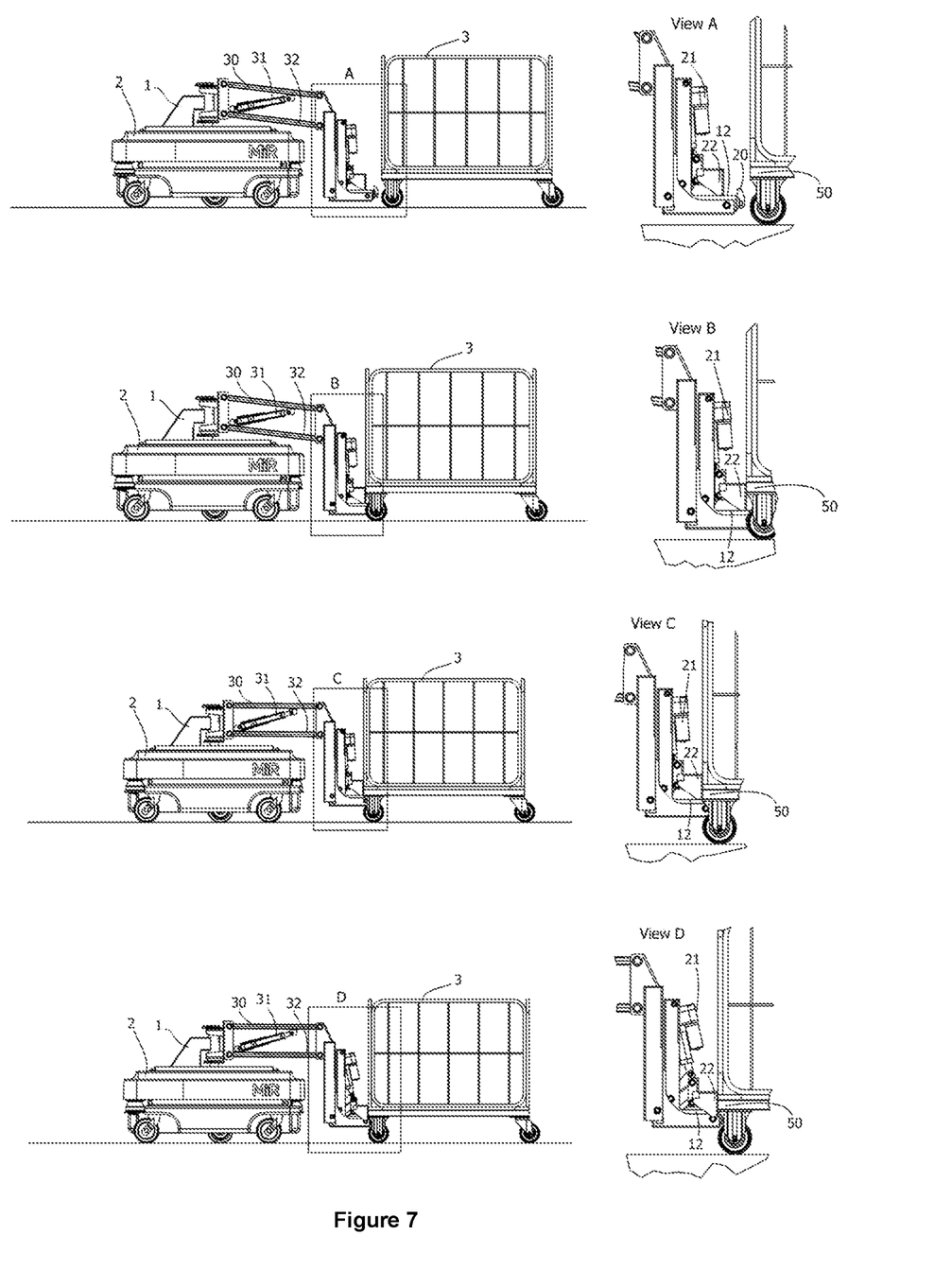
FIG. 7 shows the procedure for linking the cart and the cart attaching mechanism.

FIG. 7 shows the procedure for linking the cart (3) and the cart attaching mechanism (1), wherein:

View A illustrates the situation where the vehicle (2) has determined the position of the cart (3), whereby the flexible suspension of the cart attaching mechanism is lowered by means of the linear actuator (31);

View B illustrates the situation where the vehicle (2) moves rearwards until there is contact between the supporting bracket (22) and the cart frame (50);

View C illustrates the situation where the flexible suspension coupling mechanism is raised by means of the linear actuator (31) until there is contact between the joint (12) and the frame (50);

View D illustrates the situation where the linear actuator (21) extends and pushes the base frame (50) back toward the hook (20) (View A) and the coupling between the cart attaching mechanism (1) and the cart (3) is established. Decoupling is done by the reverse operation (not shown).

The invention claimed is:

1. A vehicle for towing a cart having wheels and frame; the vehicle comprising:
    drive wheels;
    a robot body mounted on the drive wheels;
    a control system;
    a cart attaching mechanism connected to the robot body, the cart attaching mechanism for connecting the cart to the robot body; and
    at least one proximity sensor on the robot body to perform sensing, the control system for adjusting a position of the vehicle and for detecting obstacles based on the sensing;
    wherein the cart attaching mechanism comprises an arm that is rotatable in a horizontal plane, the arm having a first end that is mounted to pivot relative to the robot body and having a second end comprising a gripper for gripping the cart, the gripper comprising:
        a first structure connected to the arm;
        a second structure connected pivotally to the first structure;
        a hook connector comprising a hook that is connectable to the frame, the second structure being pivotally connected relative to the hook connector; and
        supporting brackets, a supporting bracket being on each side of the hook connector, the supporting brackets being movable towards the hook to exert, in combination with the hook, a clamp force against part of the frame.

2. The vehicle of claim 1, wherein the at least one proximity sensor comprise an infrared range sensor, an ultrasound sensor, a LIDAR (light detection and ranging) sensor, or a stereo vision sensor.

3. The vehicle of claim 1, further comprising:
springs to implement a flexible connection between the hook connector and the second structure.

4. The vehicle of claim 3, wherein the springs are connected to a common element that is pivotally connected to a pivot point.

5. The vehicle of claim 1, further comprising:
a navigational system comprising an automatic control and guidance system for enabling the vehicle to reach a target while avoiding collisions.

6. The vehicle of claim 1, further comprising:
a linear actuator connected to a structure holding the supporting brackets, the linear actuator being controllable to extend to cause the supporting brackets to move towards the hook.

7. The vehicle of claim 6, further comprising:
a support structure to which the first structure and the second structure are connected pivotally connected, the linear actuator connecting the supporting brackets to the support structure.

8. The vehicle of claim 7, further comprising:
a first spring between the first structure and the support structure; and
a second spring between the second structure and the support structure.

9. The vehicle of claim 8, wherein the first spring is biased to minimize an angle between a part of the first structure and a part of the support structure; and
wherein the second spring is biased to minimize an angle between a part of the second structure and a part of the support structure.

10. The vehicle of claim 1, wherein the hook is extendible horizontally.

11. The vehicle of claim 1, wherein the clamp force against the cart frame increases as the supporting brackets are forced further towards to the hook.

12. The vehicle of claim 1, further comprising:
a protractor for measuring angles relative to obstacles of the vehicle.

13. The vehicle of claim 1, wherein the hook connector comprises a frame to which the second structure is pivotally connected.

14. A vehicle for towing a cart having wheels and a frame, the vehicle comprising:
a robot comprising wheels;
a control system to control the robot;
a cart attaching mechanism connected to the robot, the cart attaching mechanism for connecting the cart to the robot, the cart attaching mechanism comprising a gripper for gripping the cart, the gripper comprising:
a hook for connecting to the frame;
supporting brackets, a supporting bracket being on each side of the hook, the supporting brackets being movable towards the hook to exert, in combination with the hook, a clamp force against part of the frame; and
a linear actuator that is connected to the supporting brackets, the linear actuator being controllable by the control system to move the supporting brackets towards the hook to exert the clamp force.

15. The vehicle of claim 14, wherein the hook is configured to contact a first part of the frame and the supporting brackets are configured to contact a second part of the frame to exert the clamp force, the first and second parts of the frame comprising opposite sides of the part of the frame.

16. The vehicle of claim 14, further comprising:
bars connecting the linear actuator to the supporting brackets, where each supporting bracket is connected to the linear actuator by a bar.

17. The vehicle of claim 14, wherein the clamp force against the cart frame increases as the supporting brackets are forced further towards to the hook.

18. The vehicle of claim 14, wherein the cart attaching mechanism comprises:
an arm to connect to the robot body;
a first structure to connect to the arm; and
a second structure to connect pivotally to the first structure.

19. The vehicle of claim 18, further comprising:
a spring to implement a connection between the first structure and the second structure.

20. The vehicle of claim 19, further comprising:
a support structure connected to the hook; and
a spring to connect the second structure to the support structure.

* * * * *

UNITED STATES PATENT AND TRADEMARK OFFICE
CERTIFICATE OF CORRECTION

PATENT NO. : 10,668,617 B2  
APPLICATION NO. : 15/566516  
DATED : June 2, 2020  
INVENTOR(S) : Niels Jul Jacobsen

Page 1 of 1

It is certified that error appears in the above-identified patent and that said Letters Patent is hereby corrected as shown below:

On the Title Page

Item (56) in the "References Cited" section in the first line under "US Patent Documents", please replace the reference listed as:
"861,339 A 7/1907 Williams et al."
With the following correct reference:
"8,613,339 B2 12/2013 Hiroyoshi".

Signed and Sealed this  
Fourteenth Day of July, 2020

Andrei Iancu  
*Director of the United States Patent and Trademark Office*